July 19, 1938.  D. SMITH  2,124,043
ADJUSTABLE SELF CENTERING DRAWBAR
Original Filed April 13, 1937
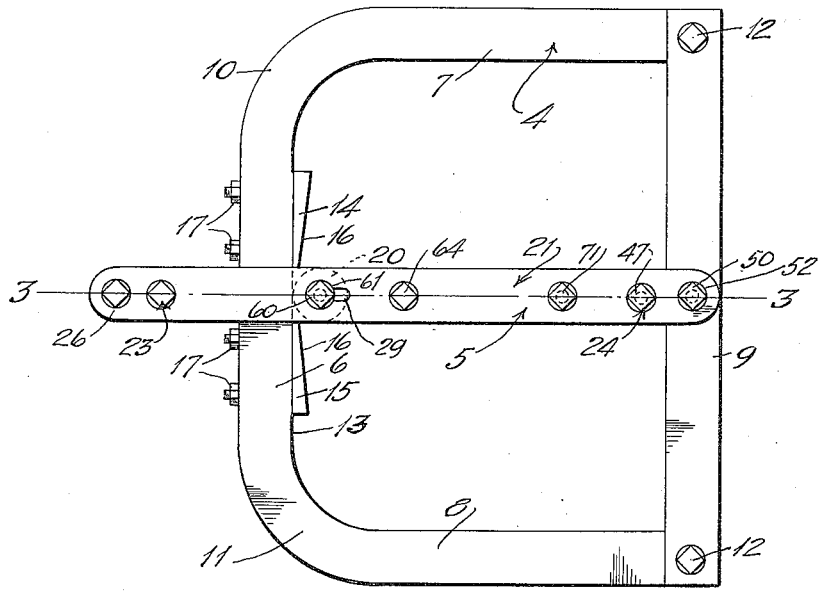
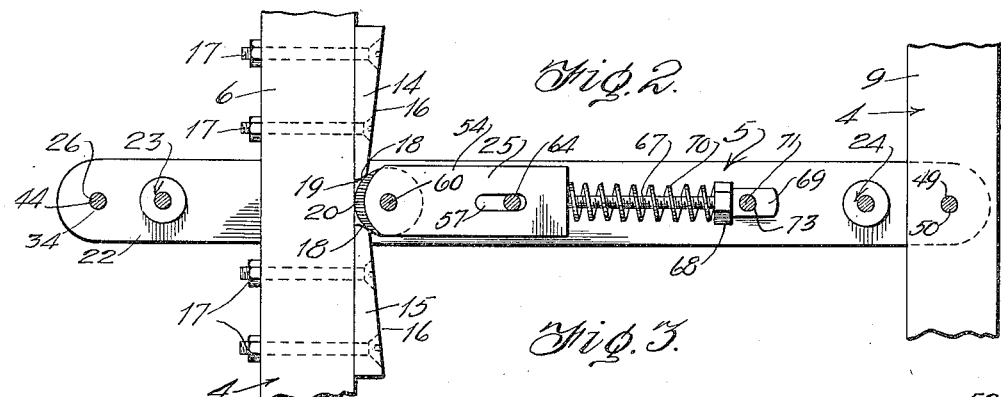
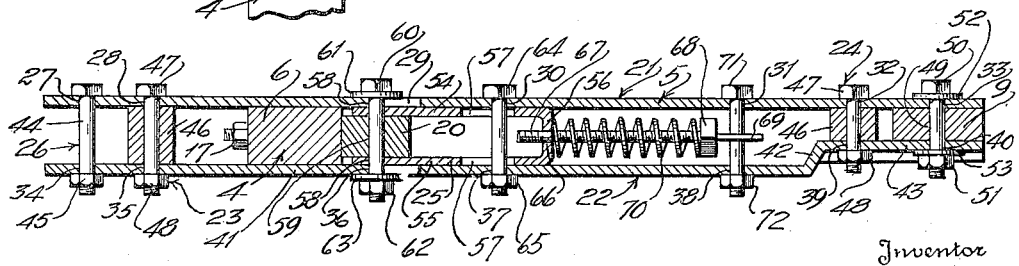
Inventor
DAN SMITH,
By Kimmel & Crowell
Attorneys.

Patented July 19, 1938

2,124,043

UNITED STATES PATENT OFFICE 2,124,043

ADJUSTABLE SELF-CENTERING DRAWBAR

Dan Smith, Liberal, Kans.

Original application April 13, 1937, Serial No. 136,683. Divided and this application July 31, 1937, Serial No. 156,787

2 Claims. (Cl. 280—33.44)

This invention relates to an automatically adjustable self-centering draw-bar structure designed primarily for use in connection with tractors, but it is to be understood that a draw-bar structure, in accordance with this invention is to be employed in any connection for which it may be found applicable.

The invention forming the subject matter of this application is a division of my application filed April 13, 1937, Serial No. 136,683.

The invention has for its object to provide, in a manner as hereinafter set forth, a draw-bar structure so constructed and arranged whereby on forward draft, the draw-bar centers and is automatically latched in such position, but in making turns, the draw-bar automatically adjusts itself and permits of a square turn and when a complete turn is made, centers for forward draft and automatically latches in such position.

A further object of the invention is to provide, in a manner as hereinafter set forth, a horizontally disposed skeleton hitch element closed at its forward and rear ends, a draw-bar pivoted to the forward end and extended rearwardly from the rear end of said element, a spring urged slidable carrier arranged within and intermediate the ends of the draw-bar and provided with a latching member bearing against and coacting with the rear end of said element for latching and centering the draw-bar on forward draft when a complete turn is made to provide for the entire load to be on and centrally of the said rear end of said element, when turning for the entire load to be on a part of the length of the latter from either side of the transverse median of such end, and for automatically latching the draw-bar centrally of said rear end on a complete turn.

Further objects are to provide, in a manner as hereinafter set forth, an automatically adjustable self-centering draw-bar structure which is simple in its construction and arrangement, strong, durable, compact, readily installed with respect to a traction means, thoroughly efficient in its use and comparatively inexpensive to manufacture.

To the above ends essentially and to others which may hereinafter appear, the invention consists of a novel construction, combination and arrangement of parts as will be more specifically described and as illustrated in the accompanying drawing wherein an embodiment of the invention is shown, but it is to be understood that changes, variations and modifications may be resorted to which fall within the scope of the invention as claimed.

In the drawing:

Figure 1 is a top plan view of the draw-bar structure,

Figure 2 is a fragmentary view and sectional plan upon an enlarged scale, and

Figure 3 is a section on line 3—3, Figure 1.

With reference to the drawing, 4 generally indicates a horizontally disposed hitch element which is adapted to be anchored to the traction means and which slidably supports the draw-bar element 5.

The element 4 is of skeleton form and consists of a rear part 6, a pair of side parts 7, 8 and a forward part 9. The element 4 includes a pair of oppositely disposed curved parts 10, 11 which form the element 4 with rounded rear corners merging into the ends of the rear part 6 and into the rear ends of the side parts 7, 8. The forward part 9 is mounted at its ends upon and is detachably secured to the forward ends of the side parts 7, 8 by the holdfast means 12.

Secured to the forward edge 13 of the rear part 6 is a pair of oppositely disposed endwise aligned strips 14, 15 spaced from opposite sides of the transverse median of part 6. The forward edges 16 of the strips 14, 15 incline forwardly throughout from their inner to their outer ends. The strips 14, 15 are of substantially triangular form and have their straight sides positioned against the edge 13. The strips 14, 15 are anchored to the edge 13 of end 6 by countersunk holdfast means 17 which extend through the strips and also through the rear end 6 of element 4. The inner ends 18 of the strips are oppositely rounded or curved. The space 19 between the inner ends of the strips in connection with the said inner ends and the central portion of the edge 13 provide a keeper for a spring controlled revoluble latching member 20, to be referred to. The holdfast devices 17 are countersunk in the inclined edges of the strips 14, 15.

The draw-bar element 5 consists of an upper section in the form of a bar 21, a lower section in the form of a bar 22, combined spacing, bracing and coupling structures 23, 24, a spring urged carrier 25, the latching member 20 and the hitch 26.

The bar 21 is flat, straight throughout and formed inwardly adjacent its rear end with an opening 27 and forwardly of the opening 27 with an opening 28, a slot 29, an opening 30, an opening 31, an opening 32 and an opening 33. The opening 28 is arranged between the opening 27 and slot 29. The opening 30 is arranged between the slot 29 and the opening 31. The opening 32 is arranged between the openings 31 and 33. The opening 33 is positioned in proximity to and rearwardly of the forward end of bar 21.

The bar 21 is positioned on the upper face of the element 4. The bar 22 is positioned against the lower face of the element 4.

The bar 22 is formed with an opening 34 aligning with the opening 27, an opening 35 aligning with the opening 28, a slot 36 aligning with the slot 29, an opening 37 aligning with the opening 30, an opening 38 aligning with the opening 31, an opening 39 aligning with the opening 32 and an opening 40 aligning with the opening 33. The bar 22 is formed of rear, intermediate and forward stretches 41, 42 and 43 respectively. The stretch 41 is of materially greater length than the other of said stretches. The stretch 43 is of greater length than stretch 42. The latter extends upwardly at a forward inclination from the forward end of stretch 41 to the rear end of stretch 43 whereby the stretches 41, 43 are disposed in parallel planes. The forward end 9 of element 4 is of less thickness than the rear end 6 of such element. The upper face of the forward end 9 is flush with the upper face of the rear end 6 of element 4. The lower face of the forward end 9 is arranged above the lower face of the rear end 6, and the stretch 43 is offset relative to stretch 41 for the purpose of stretch 43 abutting the lower face of forward end 9 of element 4. The openings 34, 35, 37, 38 and slot 36 are arranged in the stretch 41 of the bar 22. The openings 39, 40 are arranged in the stretch 43 of the bar 22.

The hitch 26 as shown consists of a headed bolt 44 and a clamping nut 45. The shank of bolt 44 extends through the aligned openings 27, 34. The head of bolt 44 abuts the bar 21. The nut 45 bears against the bar 22.

The structure 23 is of greater height than the structure 24. The structure 23 is arranged between the bar 21 and the stretch 41 of bar 22. The structure 24 is arranged between the bar 21 and the stretch 43 of the bar 22. The structures 23, 24 are of like form with the exception aforesaid stated that the structure 23 is of greater height than the structure 24 and each of said structures includes a sleeve 46, a headed bolt 47 and a clamping nut 48. The sleeve 46 abuts the inner faces of the bars 21, 22. The shank of bolt 47 of the structure 23 extends through the aligned openings 28, 35 and through the sleeve 46. The shank of bolt 47 of the structure 24 extends through the aligned openings 32, 39. The heads of the bolts 47 of the structures 23, 24 bear against the bar 21. The clamping nuts 48 of the structures 23, 24 bind against the stretches 41, 43 respectively of the bar 22.

The forward end 9 of the element 4 is provided with an opening 49 which aligns with the openings 33, 40 and extending through the said aligned openings is the shank of a headed pivot bolt 50 which carries on its lower end a holding nut 51. Interposed between the head of the bolt 49 and bar 21 is a washer 52 and interposed between the nut 51 and the stretch 43 of bar 22 is a washer 53. The bolt 49 pivotally connects the upper and lower sections of the draw-bar to the forward end 9 of the element 4, and the bolt 49 in connection with the nut 51 retains the sections of the draw-bar coupled with the element 4. The bars 21, 22 extend rearwardly from the rear end of element 4 and the coupling structure 23 is arranged rearwardly of the rear end 6 of element 4. The structure 23 is arranged between the hitch 26 and the rear end 6 of element 4.

The carrier 25 is arranged between bars 21, 22 and forwardly of the rear end 6 of element 4. The carrier 25 in lengthwise section is of yoke-shaped contour and is formed of a top part 54, a bottom part 55 and a forward end part 56 disposed at right angles to and merging into the forward ends of the top and bottom parts 54, 55 respectively. The parts 54, 55 are arranged in superposed relation and slide respectively against the inner faces of the bars 21, 22 respectively. The top and bottom parts 54, 55 respectively having aligning slots 57 lengthwise thereof having their rear ends arranged in proximity to the part 56 of the carrier 25. The top and bottom parts 54, 55 of the carrier 25 in proximity to their rear ends have aligning openings 59 which align with the slots 29, 36 and which further align with the bore 59 of the revoluble latching member 20, the later being in the form of a roller.

Extending through the aligned slots 29, 36, the aligned openings 58 and bore 59 of member 20 is a headed bolt 60 which provides the shaft for the member 20. The head of bolt 60 is arranged over the bar 21 and interposed between the head of such bolt and bar 21 is a washer 61. The lower end of bolt 60 carries a clamping nut 62 and interposed between the latter and the stretch 41 of bar 22 is a washer 63. The bolt 60 not only provides a shaft for the member 20, but in connection with the nut 62 and washers 61, 63, slidably connects the carrier 25 to the upper and lower sections of the draw-bar element 5. The carrier 25 is also slidably connected with the draw-bar by a headed bolt 64 having its shank extending through the openings 30, 37 and through the slots 57 formed in the carrier. The head of the bolt 64 bears against the bar 21. A clamping nut 65 is provided on the lower end of the shank of bolt 64 which abuts the stretch 41 of the bar 22. The bolt 64 also provides for connecting the bars 21, 22 together and also acts as a stop for the sliding movement of the carrier in opposite directions.

The forward end part 56 of the carrier 25 has a centrally arranged threaded opening 66 with which engages an adjustable peripherally threaded rod 67 projecting forwardly from carrier 25. The rod 67 at its forward end is provided with an adjusting nut 68 and an apertured coupler 69. Interposed between the adjusting nut 68 and the forward end part 56 of carrier 25 and surrounding rod 67 is a coiled spring 70 permanently functioning to urge the carrier 25 rearwardly to maintain the latching member 20 against the rear end 6 of element 4. Extending through the aligned openings 31, 38 is the shank of a headed bolt 71 carrying on its lower end a clamping nut 72. The shank of bolt 71 extends through the aperture 73 in the coupler 69. The bolt 71 constitutes an anchorage for the forward end of the rod 67. The head of bolt 71 bears against the bar 21 and the nut 72 binds against stretch 41 of bar 22. The bolt 72 not only provides an anchorage for rod 67, but in connection with the nut 72 connects the bars 21, 22 together.

The nut 68 in connection with the forward end part 56 provides for maintaining the spring 70 at the desired tension to cause the member 20 to always bear against the rear end 6 of element 4 and also to seat itself in the keeper provided on the said read end 6.

The construction disclosed provides for the draw-bar element to be centrally latched with respect to the rear part 6 of element 4, and the draw-bar element to be automatically latched with the rear end 6 of element 4 when a tractor moves from turning position to forward draft, and the latching member provides for the load to be carried by the rear part 6 of element 4.

What I claim is:

1. An automatically centering draw-bar for use with a skeleton hitch element, said element having a forward and a rear part, the rear part being provided with a keeper means and spaced oppositely disposed surfaces inclining in a direction towards said keeper means, said draw-bar including a pair of superposed sections arranged one above and the other below said hitch element, said sections being pivotally connected to said forward part by a means anchored to the latter, a horizontally disposed rearwardly urged spring controlled carrier arranged between and slidably connected to said sections forwardly of and in proximity to the said rear part, a revoluble latching member positioned within and extended from the rear end of the carrier for coaction with said keeper means for latching the draw-bar in centered position on forward draft and for riding against one of said surfaces when the draw-bar is disposed at various angles to said element, said carrier permanently maintaining said member in engagement with said rear part, and a shaft forming means extending through said sections and the rear of the carrier and upon which said member is revolubly mounted, said sections provided with aligned slots lengthwise thereof for the passage of the said shaft forming means.

2. An automatically centering draw-bar for use with a skeleton hitch element, said element having a forward and a rear part, the rear part being provided with a keeper means and spaced oppositely disposed surfaces inclining in a direction towards said keeper means, said draw-bar including a pair of superposed sections arranged one above and the other below said hitch element, said sections being pivotally connected to said forward part by a means anchored to the latter, a horizontally disposed rearwardly urged spring controlled carrier arranged between and slidably connected to said sections forwardly of and in proximity to the said rear part, a revoluble latching member positioned within and extended from the rear end of the carrier for coaction with said keeper means for latching the draw-bar in centered position on forward draft and for riding against one of said surfaces when the draw-bar is disposed at various angles to said element, said carrier permanently maintaining said member in engagement with said rear part, a shaft forming means extending through said sections and the rear of the carrier and upon which said member is revolubly mounted, said sections provided with aligned slots lengthwise thereof for the passage of the said shaft forming means, and means connected with the carrier and anchored with said sections for supporting and adjusting the tension of the controlling spring for the carrier.

DAN SMITH.